United States Patent [19]
Nascone

[11] Patent Number: 5,293,735
[45] Date of Patent: Mar. 15, 1994

[54] MULCHING BLADE FOR ROTARY LAWN MOWER

[76] Inventor: Louis Nascone, P.O. Box 868, Brick Town, N.J. 08723

[21] Appl. No.: 916,619

[22] Filed: Jul. 22, 1992

[51] Int. Cl.⁵ .............................................. A01D 34/68
[52] U.S. Cl. .............................................. 56/255; 56/295
[58] Field of Search ........ 56/255, 295, 17.5, DIG. 17, 56/DIG. 20; 30/347, 357, 346.57

[56] References Cited

U.S. PATENT DOCUMENTS

| | | | |
|---|---|---|---|
| 3,343,352 | 9/1967 | Freedlander et al. | 56/295 |
| 4,977,735 | 12/1990 | Davis | 56/295 |
| 5,109,656 | 5/1992 | Zimmer | 56/17.5 |
| 5,117,616 | 6/1992 | McLane | 56/17.5 |

FOREIGN PATENT DOCUMENTS 3123244  6/1982  Fed. Rep. of Germany ........ 56/295

*Primary Examiner*—Terry Lee Melius
*Attorney, Agent, or Firm*—Clifford G. Frayne

[57] ABSTRACT

A mulching blade for rotary lawn mowers having a centrally-disposed mounting point and two cutting arms extending outwardly therefrom, each cutting arm having a leading edge and a trailing edge, the leading edge being sharpened to form a cutting edge for severing grass, at least one of the arms being angled downwardly from said trailing edge to said leading edge to induce grass clipping upwardly for subsequent engagement with the cutting edge of the second cutting arm in order to finely mulch the grass clippings. Each cutting arm is generally horizontally planar proximate to the cutting edge to allow for ease in resharpening.

12 Claims, 2 Drawing Sheets

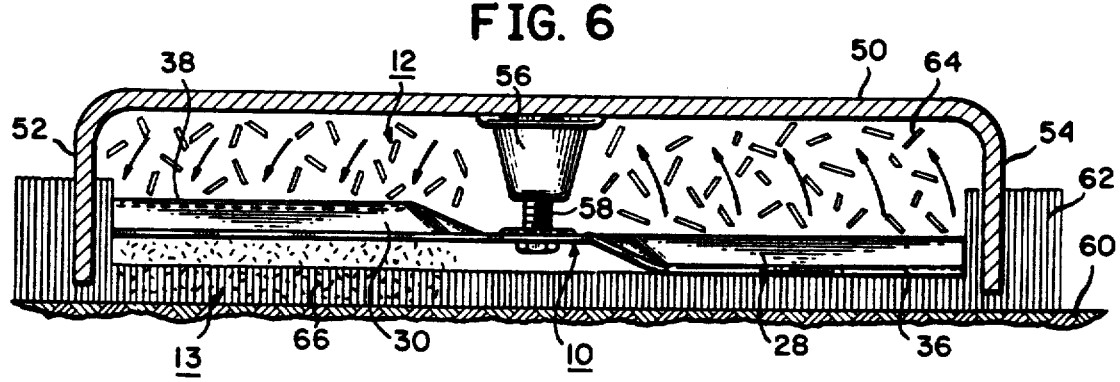
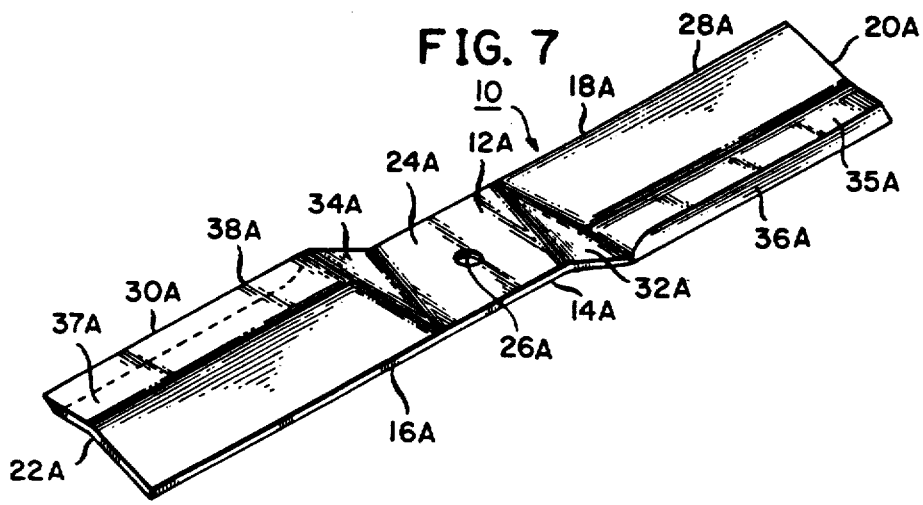
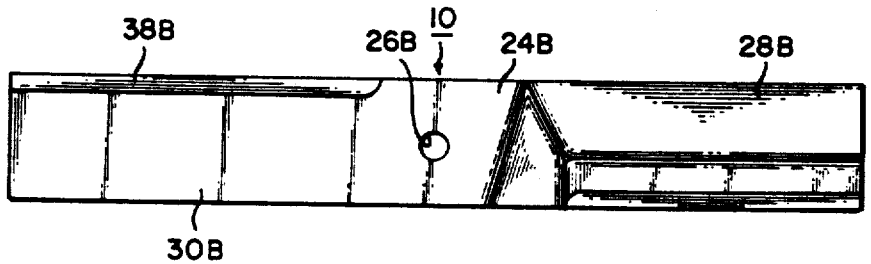

MULCHING BLADE FOR ROTARY LAWN MOWER

BACKGROUND OF THE INVENTION

The present invention relates to a lawn mower blade for rotary lawn mowers and, in particular, to a novel mulching blade for rotary lawn mowers of the type used by commercial lawn services and commercial landscapers.

In performing lawn services and landscaping service in the nature of mowing lawns and trimming, it is a consistent desire to mulch the grass clippings as fine as possible so that the clippings can be utilized as nutrients, beneficial to the lawn, by having the clippings gravitationally filtered down to the soil. At the outset, rotary-type lawn mowers had poor distribution of grass clippings which required additional labor to rake the clippings for disposal and thereby deprive the lawn of the nutrient value of the clippings. There have been improvements in the mower blades utilized with rotary mulching mowers in an attempt to minimize this problem and the collection of clipping deposits within the rotary blade housing which have deleterious effects upon mower performance. In particular, Wininger in U.S. Pat. No. 3,003,298; Davis in U.S. Pat. No. 2,836,024; Cope in U.S. Pat. No. 3,538,692 and Freedlander in U.S. Pat. No. 3,343,352 have addressed attempted improvements in mulching the lawn clippings utilizing either a particularly shaped blade or a combination of blade and housing improvements to improve the mulching characteristics of the particular mower.

Applicant's invention is directed towards a novel blade for obtaining improved mulching characteristics. Applicant's rotary blade could have application to lawn mowers of the domestic type in which a single rotary blade revolves within a housing, but Applicant's invention is more particularly suited to commercial or industrial rotary mowers in which there are usually two or three rotary blades positioned within sectionalized housings and powered by a single engine utilizing either pulley or gear connections for the rotation of the blades.

Applicant's novel blade structure is designed to induce and control the turbulence within the blade housing to ensure that the grass clippings are subjected to a plurality of significant contacts with the cutting edge of the blade.

OBJECTS OF THE INVENTION

It is an object of the present invention to provide for a novel mulching blade for a rotary lawn mower which induces and controls the turbulence within the blade housing so as to subject the grass clippings to a plurality of engagements with the cutting surfaces of the blade.

It is a further object of the present invention to provide for a novel mulching blade which controls the direction of the grass clippings within the blade housing to ensure that the grass clippings are subjected to multiple contact with the cutting edges of the blade.

It is a still further object of the present invention to provide for a novel mulching blade for a rotary mower in which the structure of the blade induces the turbulence and controls the path of the grass clippings.

It is a still further object of the present invention to provide for a novel mulching blade for a rotary lawn mower which results in finer size grass clippings which are more easily gravitationally filtered and settled down between the grass growth or grass stems over which the blade has been operating.

SUMMARY OF THE INVENTION

These and other objects of the present invention are obtained by means of a mulching blade for rotary lawn mowers having a central mounting point and having two cutting arms disposed in 180° relationship to each other about said mounting point, the first cutting arm being angled downwardly from said mounting point and terminating in a first cutting edge, the second arm being planer or angled upwardly from said mounting point and terminating in a second cutting edge, the first cutting edge designed to initially cut the growth from its stems and to throw such clippings upwardly within the housing of said blade, the second cutting edge designed to further cut the grass clippings while in suspension within the housing, the rapid revolution of the blade thereby subjecting the grass clippings to multiple contact with the cutting edges while within the blade housing, the second cutting arm eventually inducing a down draft to force the finely cut grass clippings downwardly into the lawn or area which has just been mowed thereby providing nutrients for the lawn.

BRIEF DESCRIPTION OF THE DRAWINGS

These and other objects and advantages of the present invention will become evident, particularly when taken in view of the following drawings:

FIG. 6 is a cutaway view of the mulching blade within a blade housing illustrating the path of the grass clippings;
FIG. 7 is a perspective view of the second embodiment of the mulching blade.
FIG. 8 is a top view of a third embodiment of the mulching blade.

DETAILED DESCRIPTION OF THE DRAWINGS

Figure 1:
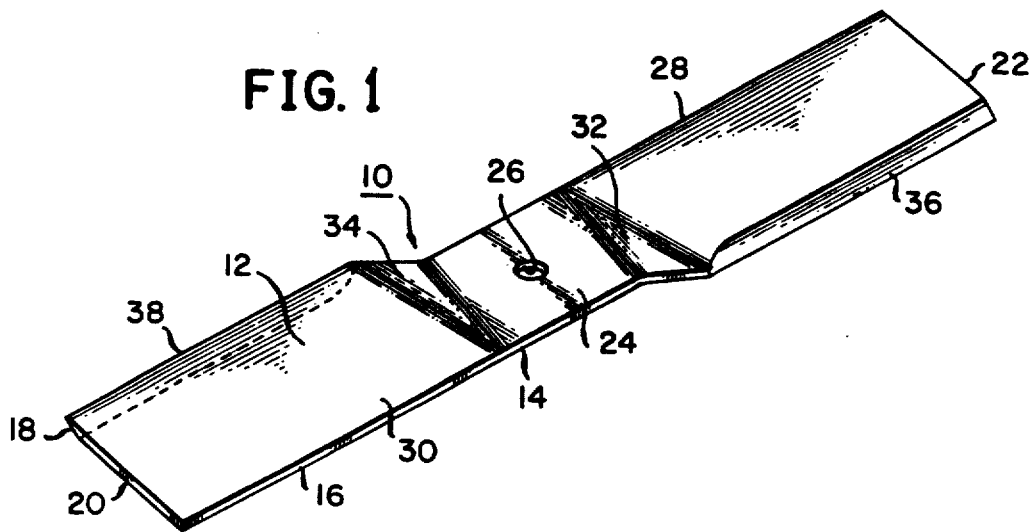
FIG. 1 is a perspective view of the mulching blade.

Referring to FIG. 1, there is a perspective view of mulching blade 10. Mulching blade 10 is generally rectangular in shape having an upper surface 12, a lower surface 14, parallel side surfaces 16 and 18 and end surfaces 20 and 22. Mulching blade 10 is divided on upper and lower surfaces 12 and 14 into five (5) distinct areas. These areas are formed in the forging or casting process in the forming of mulching blade 10.

The first of these areas comprises a mounting segment 24 which is centrally disposed on mulching blade 10 and has a centrally-positioned, mounting aperture 26 passing therethrough.

Disposed outwardly from mounting segment 24 are a first cutting arm 28 and a second cutting arm 30, disposed in 180° relationship with each other about mounting segment 24.

First cutting arm 28 is angled downwardly in relationship to mounting segment 12 such that side surface 16 of first cutting arm 28 is disposed below side surface 18 of first cutting arm 28. The downward angularity forms a shoulder 32 between first cutting arm 28 and mounting segment 24. Second cutting arm 30 is angled upwardly in relationship to mounting segment 24 such that side surface 18 of second cutting arm 30 is positioned upwardly or above side surface 16 of second cutting arm 30. This angularity creates a shoulder 34 between second cutting arm 30 and mounting segment 24.

Side surface 16 of first cutting arm 28 which is disposed in a downwardly angled position is slightly angled and sharpened to form first cutting edge 36 on first cutting arm 28. Similarly, side surface 18 on second cutting arm 30 is angled and sharpened to form second cutting edge 38 on second cutting arm 30.

Cutting edge 36 extends from shoulder 32 along side surface 16 to end surface 22; and cutting edge 38 extends from shoulder 34 along side surface 18 of second cutting arm 30 to end surface 20.

Figure 2:
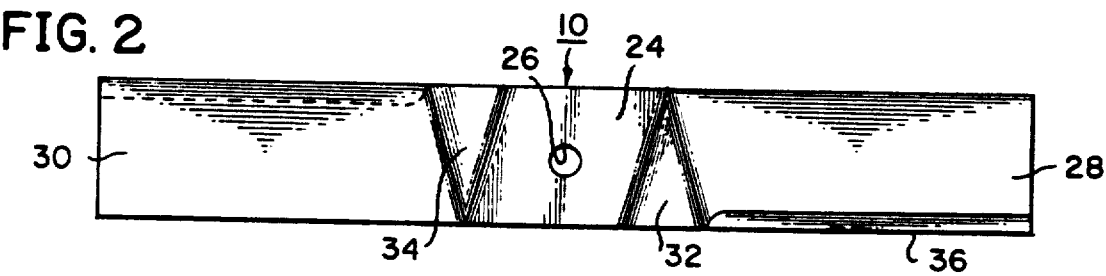
FIG. 2 is a top view of the mulching blade.
Figure 3:
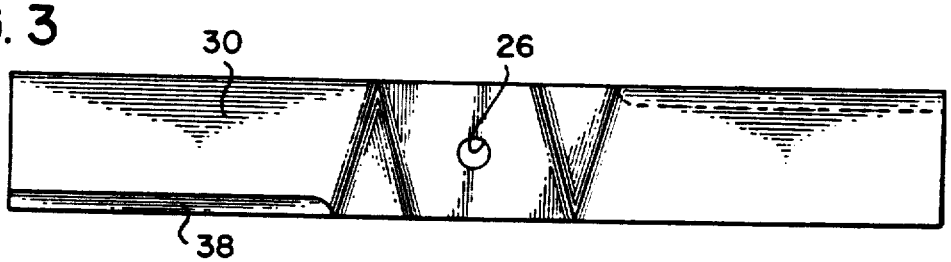
FIG. 3 is a bottom view of the mulching blade.

FIG. 2 is a top view of mulching blade 10 illustrating the relationship between mounting segment 24, first cutting arm 28, second cutting arm 30, and shoulders 32 and 34, respectively. FIG. 2 illustrates the five (5) distinct areas into which the top surface of mulching blade 10 is divided. First cutting edge 36 on first cutting arm 28 can readily be seen in FIG. 2. FIG. 3 is a bottom view of mulching blade 10 illustrating that bottom surface 14 of mulching blade 10 is divided into identical segments similar to upper surface 12 of mulching blade 10. In the bottom view as illustrated in FIG. 3, second cutting edge 38 on second cutting arm 30 can be viewed while the first cutting edge 36 on first cutting arm 28 is now out of view.

Figure 4:
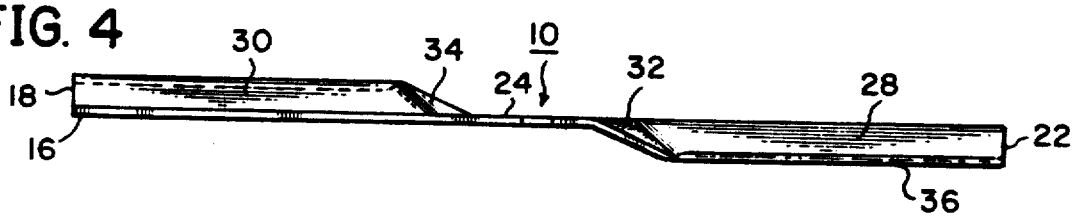
FIG. 4 is a front view of the mulching blade.
Figure 5:
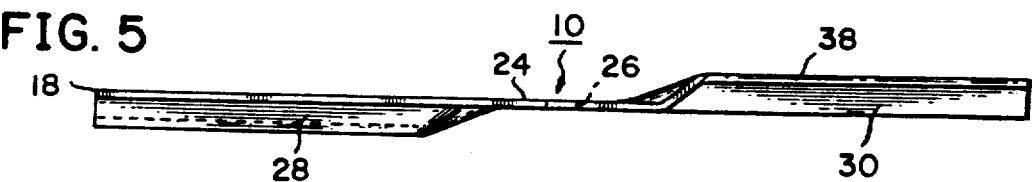
FIG. 5 is a rear view of the mulching blade.

FIG. 4 is a side view of mulching blade 10 viewing mulching blade 10 from side surface 16. In this view, first cutting edge 36 can then be seen positioned on first cutting arm 28 and extending from shoulder 32 along side surface 16 to end surface 22 of mulching blade 10. FIG. 5 is a side view of mulching blade 10 viewed from side surface 18 which illustrates the positioning of second cutting edge 38 along second cutting arm 30 and its position at a height above mounting segment 24 while first cutting edge 36 of first cutting arm 28 is positioned below the plane of mounting segment 24.

Referring to FIG. 6, there is illustrated a side, partial cutaway view of the positioning of mulching blade 10 within a lawn mower housing. FIG. 6 illustrates the positioning of a single mulching blade 10 within a single housing, but as previously stated, Applicant's blade has application to commercial and industrial size mowers in which multiple blades are positioned within housings in either a side-by-side configuration or a triangular configuration. Referring to FIG. 6, housing 48 consists of an upper surface 50 and sidewalls 52 and 54. Additional front and rear sidewalls (not shown) would form an enclosure about mulching blade 10. The mower apparatus would typically have a height adjustment assembly (not shown) well known in the art, to adjust the height of housing 48 and in doing so adjust the height of mulching blade 10. Mulching blade 10 is secured within housing 48 by means of a coupling unit 56 which passes through aperture 26 in mounting segment 24 of mulching blade 10 and secures mulching blade 10 to spindle 58 by means of either a locking nut or keying mechanism. Coupling 56 would typically be driven by means of a gear box or belt and pulley apparatus (not shown) from the motor of the lawn mower.

In operation, the operator would set the height adjustment of housing 48 and mulching blade 10 consistent with the contour of the ground 60 and height of the grass to be cut, 62. In operation, rotating in a clockwise direction, first cutting edge 36 would perform the initial cut on grass 62. Angled first cutting arm 28 would cause the grass cuttings 64 to be thrown upwardly within the housing. These grass cuttings 64 would then be in position for contacting second cutting edge 38 which would further cut and mulch grass cuttings 64. The angled slope of second cutting arm 30 would then cause the mulched grass cuttings 66 to be forced downwardly into the cut or mowed lawn to serve as nutrients for further growth.

The operating speed of the motor or engine of the lawn mower is varied in operation, but under normal operation, the revolutions per minute of spindle 58 and thus mulching blade 10 would be such that grass cuttings 64 would be subjected to several potential contact engagements with second cutting edge 38 to finally mulch the cuttings before returning them to the ground. Further, the design and operation of mulching blade 10 and the turbulence which it would create, serves to significantly lessen the accumulation or buildup of grass cuttings on the interior surface of housing 48.

FIGS. 7 illustrates a perspective view of a second embodiment of mulching blade 10. This embodiment provides for additional ease in sharpening the cutting edges of mulching blade 10 and setting the cutting height. In this embodiment, mulching blade 10 is again generally rectangular in shape having an upper surface 12A, a lower surface 14A, parallel side surfaces 16A and 18A and end surfaces 20A and 22A. Mulching blade 10 is divided on its upper and lower surfaces 12A and 14A into seven (7) areas. These areas are formed in the forging or casting process in the forming of mulching blade 10.

The first of these areas comprises a mounting segment 24A which is centrally disposed on mulching blade 10 and has a centrally-positioned mounting aperture 26A passing therethrough. Disposed outwardly from mounting segment 24A are a first cutting arm 28A and a second cutting arm 30A, disposed in 180° relationship with each other about mounting segment 24A.

First cutting arm 28A is angled downwardly in relationship to mounting segment 24A such that side surface 16A of first cutting arm 28A is disposed below side surface 18A of first cutting arm 28A. This downward angularity forms a shoulder 32A between first cutting arm 28A and mounting segment 24A. Second cutting arm 30A is angled upwardly in relationship to mounting segment 24A such that side surface 18A of second cutting arm 30A is positioned upwardly above side surface 16A of second cutting arm 30A. This angularity creates a shoulder 34A between cutting arm 30A and mounting segment 24A.

This embodiment of mulching blade 10 differs from the first embodiment in that the downward angularity between side surface 18A and side surface 16A of first cutting arm 28A levels out to a planar segment 35A before terminating at side surface 16A. First cutting edge 36A is formed along this segment at its juncture with side surface 16A.

This same structure is found on second cutting arm 30A in which the upward angularity from side surface 16A to side surface 18A on second cutting arm 30 levels out to a planar segment 37A proximate to side surface 18A. Second cutting edge 38A is formed at the juncture of planar segment 37A and side surface 18A.

The purpose of planar segments 35A and 37A is to provide a greater ease in sharpening first cutting edge 36A and second cutting edge 38A. During the life of the blade, it may have to be sharpened many times and such sharpening results in loss of material on the blade. In the first embodiment of mulching blade 10, repeated sharpening of the blade results in the loss of material from the cutting edges. In the first embodiment, this would result in the cutting edge of the first cutting arm receding upwardly and the cutting edge of the second cutting arm receding downwardly. This would require the operator to continually adjust the positioning of mulching blade 10 on its spindle aperture in order to achieve the desired cutting height. In this embodiment, the blade can be repeatedly sharpened without any change in cutting heights so that a standardized fixed setting may be maintained on the spindle.

In this second embodiment, once the blade has been sharpened to the point where the first and second cutting edge had retreated along planar segments 35A and 37A to the point where it had met the downward angularity or upward angularity of the respective cutting arms, the mulching blade would be discarded in that its effective life had concluded. This, therefore, provides the operator with a gauge as to the anticipated useful life of the blade. In the first embodiment, the operator could continue to sharpen the blade until the cutting height adjustment no longer provided sufficient allowance for obtaining the desired cutting height. At that point, the blade in the first embodiment would be discarded.

FIG. 8 illustrates a top plan view of a third embodiment of mulching blade 10. This embodiment, the mounting segment 24B, is still centrally disposed on mulching blade 10 and has a centrally-positioned mounting aperture 26B passing therethrough. Disposed outwardly from mounting segment 24B is a first cutting arm 28B and a second cutting arm 30B, disposed in 180° relationship with each other about mounting segment 24B.

First cutting arm 28B is angled downwardly in relationship to mounting segment 24B and formed in a manner substantially similar to the first cutting arm disclosed in FIG. 7 of the second embodiment of the mulching blade. This first cutting arm 28B is the cutting arm which initially engages the grass. In this embodiment, second cutting arm 30B is in planar alignment with mounting segment 24B. In other words, second cutting arm 30B is not angled upwardly as in the previous embodiments. Its cutting edge 38B is designed to engage and further cut the grass clippings once they have been severed by first cutting arm 28B. The same advantages with respect to the sharpening of the blade are available in this third embodiment as well as in the second embodiment. The structure as disclosed in the third embodiment illustrated in FIG. 8 allows for smoother operation of the lawn mower with reduced vibration.

While the present invention has been described with reference to its preferred embodiment thereof, it will be appreciated by those of ordinary skill in the art that various changes can be made in the apparatus without departing from the basic spirit and scope of the invention.

What is claimed is:

1. A lawn mower mulching blade for lawn mowers for improving the mulching characteristics of the lawn mower in severing grass from a lawn, said mulching blade comprising:
a centrally-disposed mounting segment, generally disposed in a horizontal plane having an aperture therethrough for mounting said mulching blade on the spindle drive of said lawn mower;
a first cutting arm in alignment with a second cutting arm extending outwardly from said mounting segment, said second cutting arm defined by a leading edge and a trailing edge in sloped angular relationship, said trailing edge of said second cutting arm in planar relationship with said mounting segment, said leading edge of said second cutting arm disposed above said trailing edge, said leading edge of said second cutting arm being sharpened to provide a cutting edge for engagement with grass clippings, sad first cutting arm defined by a leading edge and a trailing edge in sloped angular relationship, said trailing edge of said first cutting arm in planar relationship with said mounting segment, said leading edge of said first cutting arm disposed lower than said trailing edge, said leading edge of said first cutting arm being sharpened to provide for a cutting edge for engagement with said grass.

2. A lawn mower mulching blade in accordance with claim 1 wherein said cutting edge of said first cutting arm severs said grass and directs said grass upwardly to said trailing edge of said first cutting arm.

3. A lawn mower mulching blade in accordance with claim 2 wherein said cutting edge of said second cutting arm recuts said grass clippings directed upwardly by said first cutting arm thereby severing said grass clippings into smaller segments.

4. A lawn mower mulching blade in accordance with claim 1 wherein said first cutting arm and said second cutting arm create a turbulent updraft and downdraft respectively so as to subject the grass clippings to several cutting opportunities prior to forcing said segmented grass clippings downwardly into the root system of said lawn.

5. A lawn mower mulching blade in accordance with claim 1 wherein said first cutting arm is sloped angularly downwardly from said trailing edge to said leading edge.

6. A lawn mower mulching blade in accordance with claim 1 wherein said second cutting arm is sloped angularly upwardly from said trailing edge to said leading edge.

7. A lawn mower mulching blade in accordance with claim 1 wherein said first cutting arm becomes horizontally planer proximate to said leading edge to provide for ease of resharpening of said cutting edge of said first cutting arm.

8. A lawn mower mulching blade in accordance with claim 1 wherein said second cutting arm becomes horizontally planer proximate to said leading edge to provide for ease of resharpening of said cutting edge of said second cutting arm.

9. A lawn mower mulching blade for lawn mowers for improving the mulching characteristics of the lawn mower in severing grass from the lawn, said mulching blade comprising:
a centrally-disposed mounting segment generally disposed in a horizontal plane having an aperture therethrough for mounting said mulching blade on the spindle of said lawn mower;
a first cutting arm in alignment with a second cutting arm extending outwardly from said mounting segment, said first cutting arm defined by a leading edge and a trailing edge in sloped angular relationship, said trailing edge of said first cutting arm in planer relationship with said mounting segment, said leading edge of said first cutting arm disposed lower than said trailing edge, said second cutting arm defined by a leading edge and a trailing edge in sloped angular relationship, said second cutting arm in planar relationship with said mounting segment, said leading edge of said first cutting arm and said second cutting arm being sharpened to provide for a cutting edge for engagement with said grass.

10. A lawn mower mulching blade in accordance with claim 9 wherein said first cutting arm is sloped angularly downwardly from said trailing edge to said leading edge.

11. A lawn mower mulching blade in accordance with claim 9 wherein said first cutting arm becomes horizontally planar proximate to said leading edge to provide for ease in resharpening of said cutting edge of said first cutting arm.

12. A lawn mower mulching blade in accordance with claim 9 wherein said cutting edge of said first cutting arm severs said grass and directs said grass upwardly to said trailing edge of said first cutting arm and thence for engagement with said cutting edge on said leading edge of said second cutting arm which recuts said grass clippings into smaller segments.

* * * * *